United States Patent
Gatlin et al.

(10) Patent No.: US 7,512,934 B2
(45) Date of Patent: Mar. 31, 2009

(54) PARALLEL DEBUGGER

(75) Inventors: Kang Su Gatlin, Seattle, WA (US); Cameron Buschardt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/925,799

(22) Filed: Aug. 25, 2004

(65) Prior Publication Data

US 2006/0048098 A1   Mar. 2, 2006

(51) Int. Cl.
G06F 9/44   (2006.01)
(52) U.S. Cl. .................... 717/127; 717/124; 717/125; 717/131; 717/134; 717/135
(58) Field of Classification Search ......... 717/124–125, 717/127–129, 131, 134–135
See application file for complete search history.

(56) References Cited

U.S. PATENT DOCUMENTS

| | | | | |
|---|---|---|---|---|
| 5,325,530 | A * | 6/1994 | Mohrmann | 717/124 |
| 5,933,639 | A * | 8/1999 | Meier et al. | 717/129 |
| 6,463,465 | B1 * | 10/2002 | Nieuwejaar | 709/217 |
| 2004/0031030 | A1 * | 2/2004 | Kidder et al. | 717/172 |
| 2005/0246690 | A1 * | 11/2005 | Horton et al. | 717/125 |

OTHER PUBLICATIONS

Han, Zhi, "Automatic Comparison of Execution Histories in the Debugging of Distributed Applications", 1999.*

Dongarra et al., "Sourcebook of Parallel Computing", ISBN 1-55860-871-0, 2003.*

Cheng, D. et al., "A Portable Debugger for Parallel and Distributed Programs", *IEEE*, 1994, 723-729.

Elshoff, I.J.P., "A Distributed Debugger for Amoeba", *ACM Sigplan Notices, Proceedings of the 1998 ACM Sigplan and Sigops Workshop on Parallel and Distributed Debugging*, 1988, 24(1), 1-10.

Lumetta, S.S. et al., "The Mantis Parallel Debugger", *Proceedings of the Sigmetrics Symposium on Parallel and Distributed Tools*, 1996, 118-126.

Meier, M.S. et al., "Experiences with Building Distributed Debuggers", *Proceedings of the Sigmetrics Symposium on Parallel and Distributed Tools*, 1996, 70-79.

Pancake, C.M. et al., "Models for Visualization in Parallel Debuggers", *ACM*, 1989, 627-636.

Rajamony, R. et al., "Performance Debugging Shared Memory Parallel Programs Using Run-Time Dependence Analysis", *Sigmetrics*, 1997, 75-87.

Schulz, D. et al., "A Thread-Aware Debugger with an Open Interface", *ISSTA*, 2000, 201-211.

* cited by examiner

*Primary Examiner*—Wei Y Zhen
*Assistant Examiner*—Ryan D Coyer
(74) *Attorney, Agent, or Firm*—Woodcock Washburn LLP

(57) ABSTRACT

A debugger attaches to a parallel process that is executing simultaneously at various nodes of a computing cluster. Using a shim, executing at each node, to monitor each of the processes, the parallel process is debugged such that neither the process or the particular message passing system implemented on the cluster, needs to know of the existence or details regarding the debugger.

20 Claims, 5 Drawing Sheets

PARALLEL DEBUGGER

FIELD OF THE INVENTION

The invention is directed to the debugging of parallel applications. Specifically, the invention is directed to transparent, scalable, flexible, message passing interface independent parallel debuggers.

BACKGROUND OF THE INVENTION

Parallel computing is the simultaneous use of more than one central processing unit ("CPU") to execute a program. Ideally, parallel processing makes a program run faster because there are more CPUs executing it. Parallel computing takes many forms including clusters and grid computing, where networked computers execute portions of a program simultaneously. Developing parallel applications is notoriously difficult and parallel applications are commonly considered the most difficult type of application to debug.

Previous attempts to debug parallel applications have been either too cumbersome, or too restrictive. In one solution, each process making up the parallel application is started in a suspended mode at each computer or node of the cluster. Similarly, a debugging client is also executed at each node. Each debugging client attaches to the respective process running on that particular node, and the processes are restarted simultaneously. The resulting debugger information is then collected from each node to debug the total application. This solution suffers from a lack of scalability, as the number of nodes in the grid grows, the number of debugger clients required grows, making debugging large scale parallel applications very difficult.

Another solution, utilized in the Totalview® debugger by Etnus, involves the use of a separate debugging application programming interface ("API") that is built directly into the message passing interface ("MPI"). Application designers add code from the debugging API to allow them to more easily debug the resulting parallel applications. This solution is inflexible, because it ties the application to the particular debugger chosen, as well as provides no support for older parallel applications. In addition, because this solution is tied to the MPI, it only allows debugging of the portions of the application that are actually executed in parallel. Frequently, parallel applications only execute some of the code in parallel.

Scalable and flexible systems and methods are needed for parallel debugging that are independent from the application being debugged and the underlying MPI.

SUMMARY OF THE INVENTION

The present invention provides systems and methods for parallel debugging whereby a debugger is able to attach to a parallel process that is executing simultaneously at various nodes of a computing cluster.

A debugging session is initialized at a host computer by specifying the name of the parallel application to debug, as well the name of a shim. A shim is special type of application that can monitor and collect communications coming from and going to a particular node, or process. A remote debugging session, as well as an instance of the shim, is started on each node of the computing cluster. Each of the remote debugging sessions attaches to, and executes a portion of the parallel process on each node in the cluster. Meanwhile, each of the shims monitors and collects data sent by each process, executing at their respective node, using the message passing interface.

Each shim sends the collected data to the host computer, where, along with the debugging data from each of the remote debugging sessions, the data is aggregated into an overall debugging environment.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
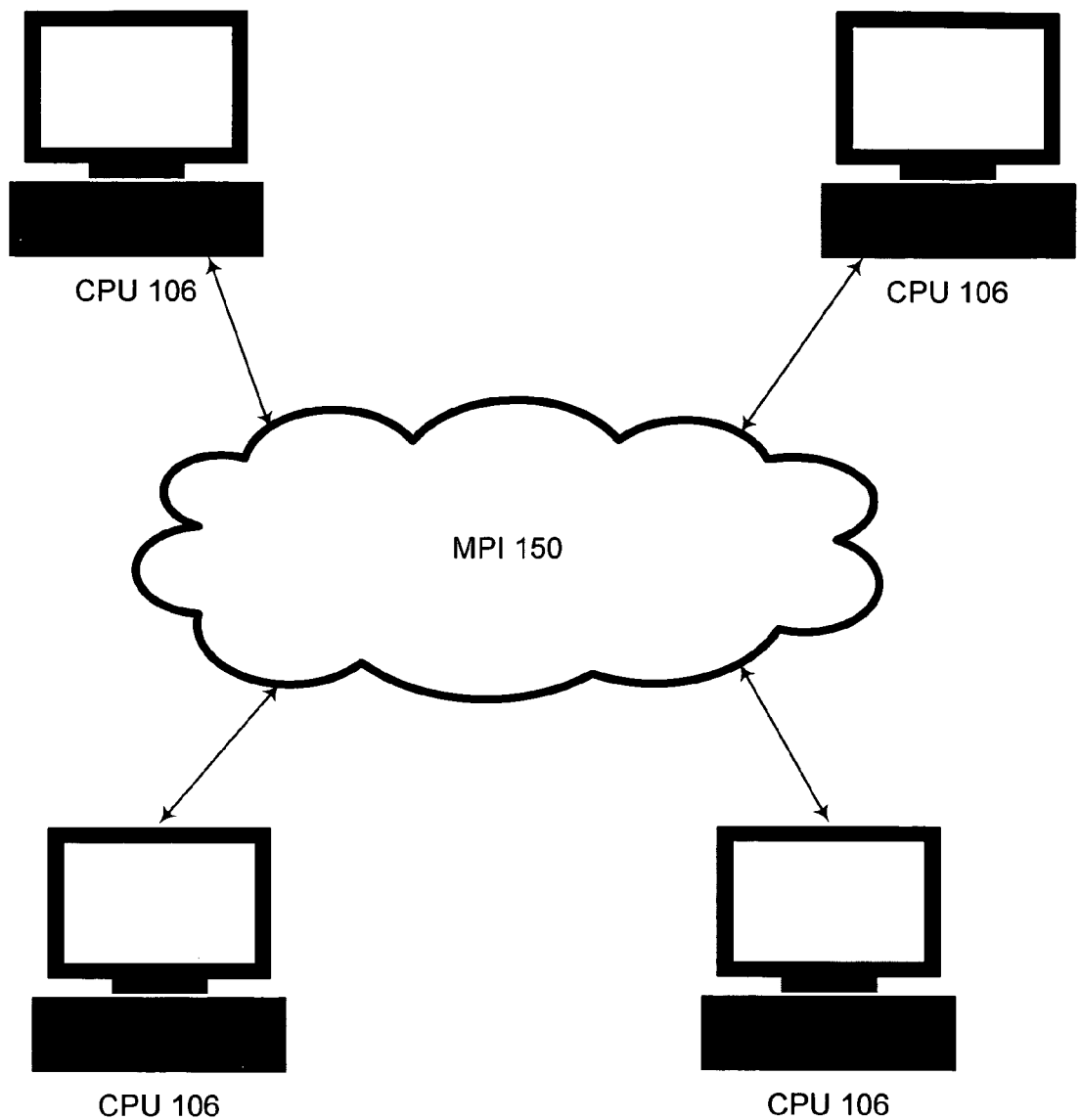
FIG. 1 is an illustration of an exemplary parallel computing system in accordance with the present invention.

FIG. 1 is an illustration of an exemplary parallel computing system 100 in accordance with the present invention. The parallel computing system 100 comprises a plurality of computers, shown on FIG. 1 as CPUs 106. The plurality of computers desirably communicate to each other through the message passing interface ("MPI") 150. The system 100 desirably enables an application to execute, in parallel, at the CPUs 106.

The CPUs 106 each represent a different computer or node in the parallel computing system 100. While only four CPUs 106 are shown, it is for illustrative purposes only and not meant to limit the invention to systems with only four nodes. The invention is applicable to systems with any number of nodes. In addition, while each CPU is represented by the identical graphic or icon on FIG. 1, it is not meant to limit the system to identical nodes. For example, a particular CPU 106 could have an X86 processor type, while another CPU 106 could use a RISC processor type.

Each CPU 106 desirably executes a portion of a parallel application. Parallel applications are written in such a way that portions of the program may be executed simultaneously at different nodes of the cluster. However, because a process executing on a particular CPU 106 may depend on another process execution on a different CPU 106, the CPUs 106 are desirably able to pass messages and values between one another using the MPI 150.

The MPI 150 can be used to communicate between CPUs 106 networked together. The network can be a local area network, for example an office network, or a more distributed wide area network, for example the internet. The MPI 150 desirably provides a standard interface through which the CPUs 106 can communicate regardless of the underlying protocol or standard used in the network. Any system, technique, or method known in the art for message passing between nodes in a cluster can be used.

Figure 2:
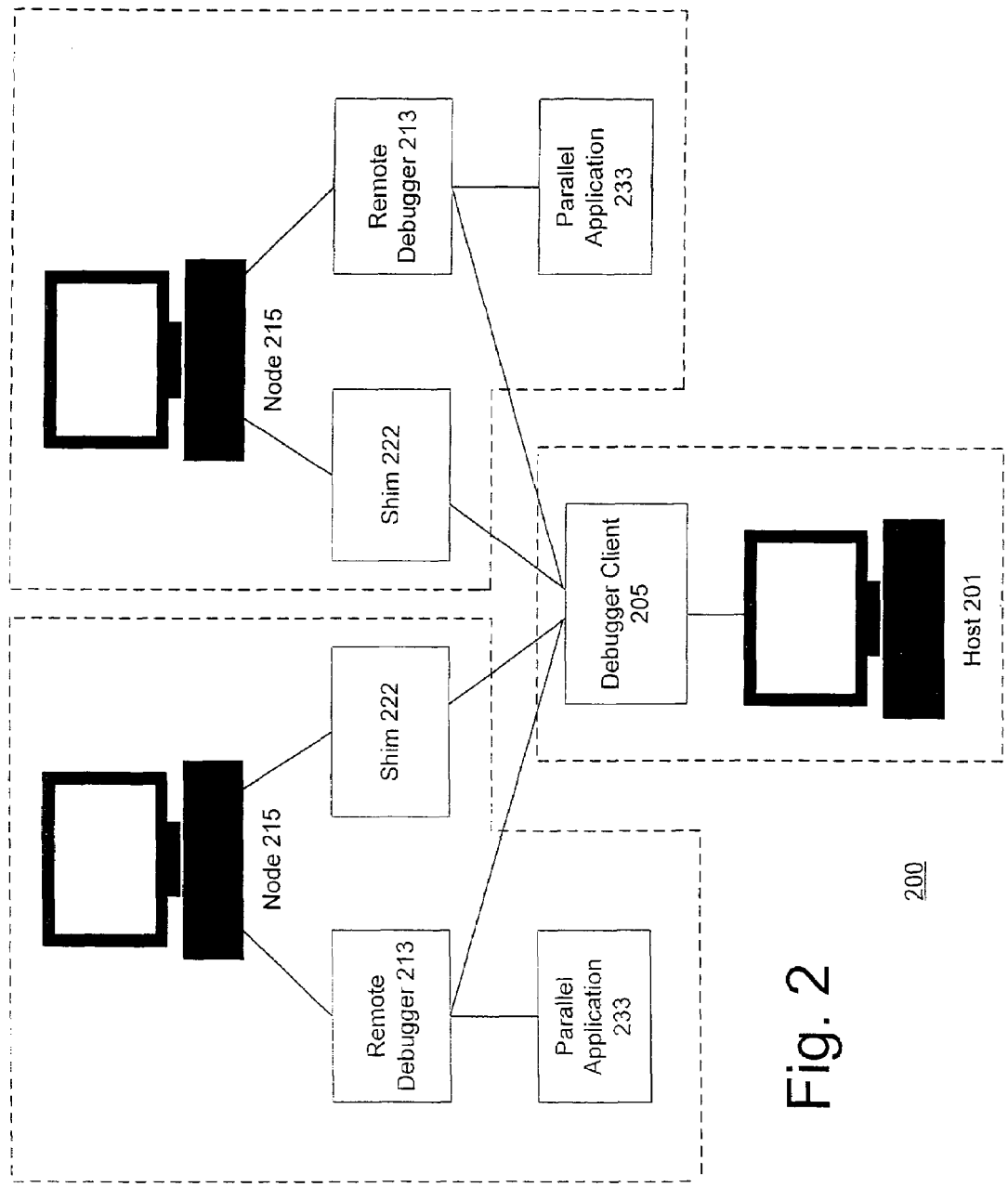
FIG. 2 is a block diagram of an exemplary debugging system for parallel applications in accordance with the present invention.

FIG. 2 is an illustration of an exemplary system 200 for debugging a parallel application in accordance with the present invention. The system 200 comprises a plurality of nodes 215 and a host 201. A debugger client 205 is desirably executed at the host 201. At each node 215, a remote debugger 213, a parallel application 233, and a shim 222 are desirably executed.

The host 201 desirably initiates, and otherwise controls, the parallel debugging session. The host 201 is desirably operated by a developer or programmer debugging the parallel application 233. The host 201 may be connected to the computing cluster that comprises nodes 215. The computing cluster is similar to the cluster described with respect to FIG. 1. While only two nodes 215 are shown in the cluster, it is for illustrative purposes only, and not meant to limit the number of nodes in the cluster to two. Any number of nodes can be supported by the system.

The debugger client 205 desirably executes on the host 201. The debugger client 205 is desirably a serial debugger commonly used to debug non-parallel or serial applications. Any debugger capable of debugging more than one executable simultaneously known in the art can be used.

Each of the nodes 215 desirably executes a remote debugging session 213. Each remote debugger session 213 desirably attaches to, and debugs the portion of parallel application 233 currently executing on their respective node 215. Each node 215 desirably executes a portion of parallel application 233 in parallel with each other.

In addition, each node 215 desirably executes a shim 222. A shim is a specialized application that monitors and collects certain types of information coming from and going to that particular node 215. In an embodiment, the shim 222 desirably collects the messages sent and received by the node 215 using the MPI. Communications sent to and from the node 215 using the MPI represent communications between portions of the parallel application 233, and are useful for debugging the overall parallel application 233. In another embodiment, the shim 222 desirably collects data written to streams, for example stdin, stdout, and stderr, by the parallel application 233 executing on the particular node 215.

Each instance of the remote debuggers 213 and the shim 222 desirably forward debugging data to the debugger client 205 as a portion of parallel application 233 executes at each node. The debugger 205 desirably aggregates the returned results to debug the overall parallel application 233.

Figure 3:
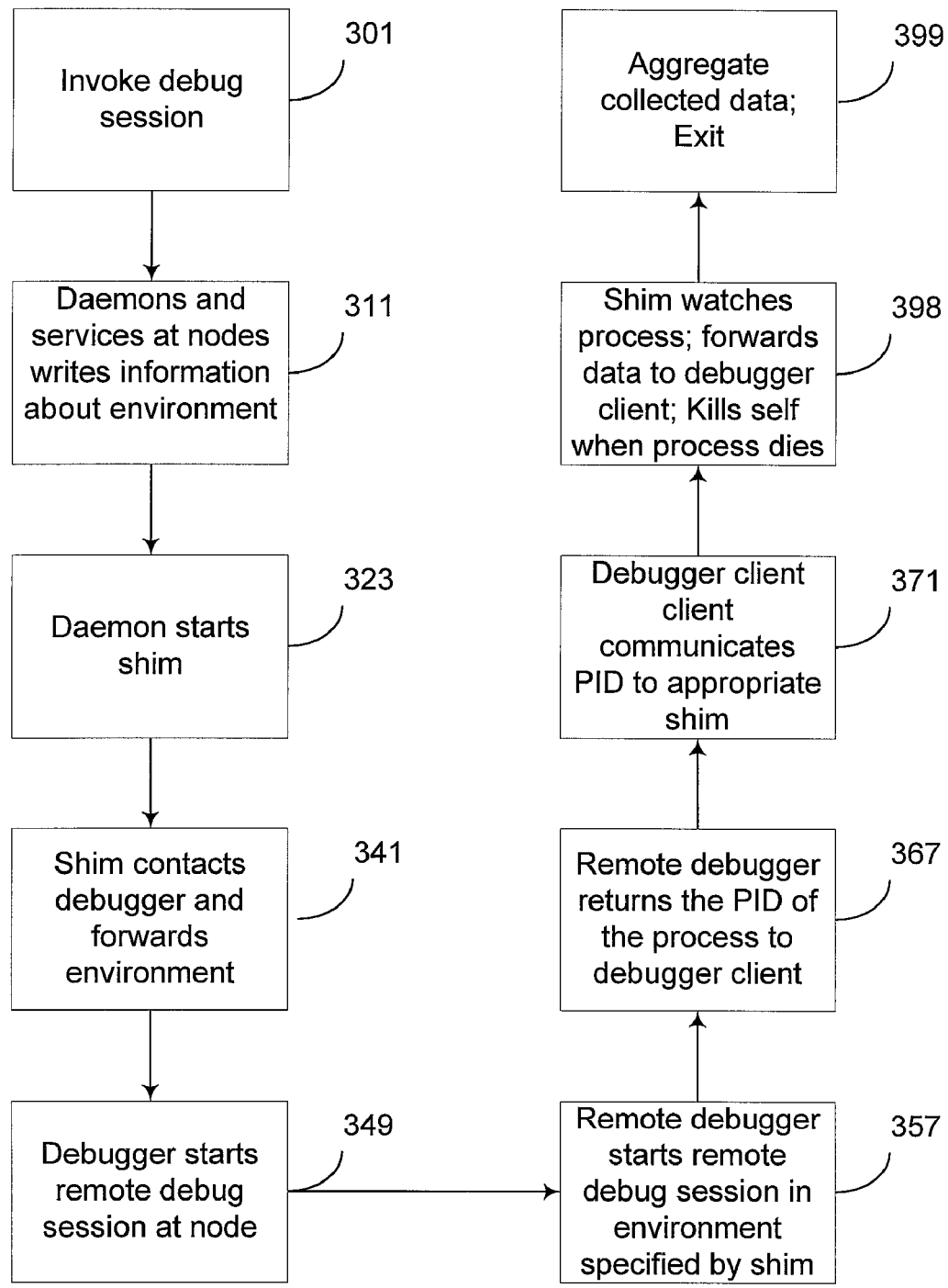
FIG. 3 is a flow diagram illustrating an exemplary method for debugging a parallel application in accordance with the present invention.

FIG. 3 is a block diagram illustrating an exemplary method for debugging a parallel application in accordance with the present invention.

At 301, the user or developer invokes an MPI debug session in the debugger client at a host computer. The user desirably supplies the name of the application that the user wishes to debug, as well as the name of the shim that the user desires to use. A shim, as described previously with respect to FIG. 2, is a type of network application that monitors and collects certain information from a node or computer on the network. More specifically, the shim can collect environmental data from the node, as well as monitor all of the messages passed to and from the node.

In addition, the debugger client desirably opens a port on the host computer to communicate with the shim. The shim is desirably configured to send all of its collected information to the host computer at this particular port.

While the present embodiment is described with respect to the MPI system, it is not meant to limit the invention to debugging parallel applications that use MPI. The invention is applicable to any system for parallel or cluster computing.

At 311, the debugger client, using MPIRun, for example, desirably communicates with each of the nodes in the cluster. More specifically, MPIRun, communicates with the MPI daemons already running at each of the nodes in the cluster. Each of the MPI daemons desirably writes information to the environment that the shim will desirably use later. The environment information can comprise any data typically associated with an application environment. The environment information can include, but is not limited to the root node name, the path, and run time location.

At 323, each daemon, running at each node of the cluster, desirably starts an instance of the shim. A shim is desirably executed at each node of the cluster, allowing the shim to collect environment information, MPI data, and other debugging information from each node in the cluster.

At 341, each shim running at a node of the cluster desirably contacts the debugger client and forwards the environment information regarding that node to the debugger client. As described above, the debugger client is desirably executing at the host computer and listening for the shim at a particular port. The debugger client desirably receives the environment information from each shim and desirably stores the information for use later. In addition to the environment information, the shim can also forward the name of the application that will be debugged, as well as a final set of arguments. Depending on how the remote application is invoked the debugger client may or may not have access to the application name prior to the invocation of the shim on the remote node.

At 349, the debugger client, running on the host computer, starts a remote debugger session at each of the nodes of the cluster. The Debugger client desirably sends a package, including the environment information, to each of the remote debugger clients. The remote debugger is desirably a serial debugger, as described with respect to FIG. 2.

At 357, the remote debugger session, executing at each node of the cluster, desirably invokes the application that is being debugged using the package provided by the debugger client. As stated previously, the shim desirably communicated, to the debugger client at the host computer, the environment for the node. The environment was desirably included in the received packaged, as discussed previously at 349.

At 367, once the application is invoked by the remote debugger at the node, the remote debugger desirably informs the debugger client at the host computer. The remote debugger informs the host computer by transmitting the process identification number ("PID") of the application running on that particular node. Each process running on a particular computer is desirably issued a PID by the operating system. The PID is local to the particular node or computer, so there may be duplicate PIDs among each of the applications running on the various nodes of the cluster. Accordingly, the host computer desirably stores the PID of each application with the name of the node that it correlates to.

At 371, the debugger client desirably sends, to each of the shims running at each node in the cluster, the PID of the application executing on that particular node. The shim desirably monitors the node and collects data regarding the application that matches the supplied PID.

At 398, the shim and the remote debugger, executing at each node, desirably send the collected data and remote debugging data back to the debugger client, allowing the debugger client to monitor, and ultimately debug, the application executing at the node. Both the shim and the remote debugger desirably continue to send the collected data and remote debugging data back to the debugger client until the application stops executing on the respective node. The shim desirably kills itself when the application finishes executing at the node.

At 399, each process making up the parallel application has desirably stopped executing, and all of the data collected by the shims, and the remote debugging data generated by the remote debuggers, has been desirably sent to the debugging client at the host computer. The debugger client desirably aggregates or combines the shim data with the remote debugging data to provide the user with a report or presentation useful for the user to debug the parallel application. The report is desirably presented to the user inside of the debugging client on the host computer. Once the user has been presented with the debugging report the embodiment can exit.

Figure 4:
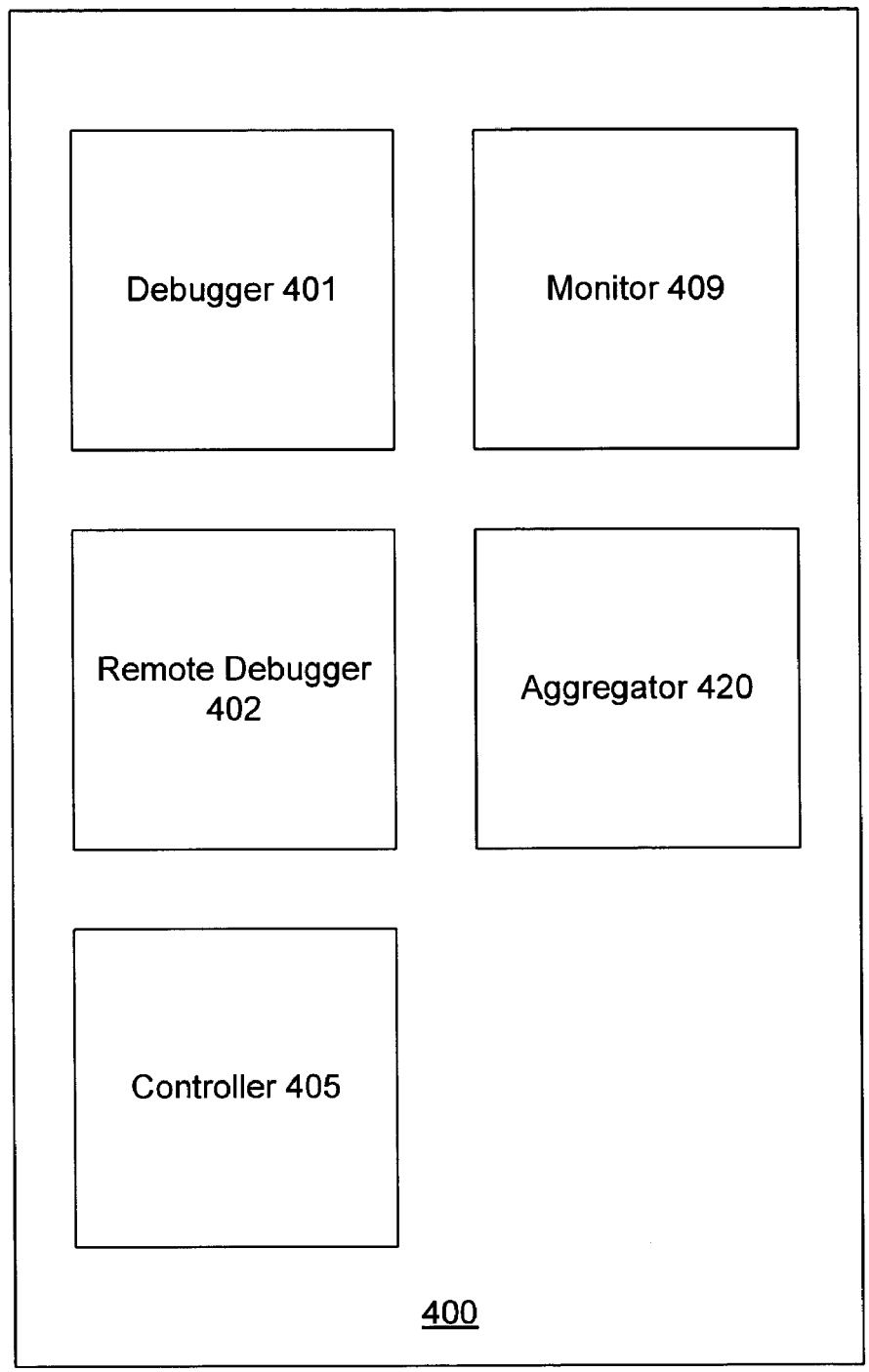
FIG. 4 is a block diagram of an exemplary debugging system in accordance with the present invention.

FIG. 4 is a block diagram of an exemplary parallel debugging system 400 in accordance with the present invention. The system includes several means, devices, components, and/or modules for performing functions. These include a debugger component 401, a remote debugger component 402, a controller component 405, a monitor component 409, and an aggregator component 420.

The debugger 401 initiates a debugging session of a particular parallel application. As described with respect to FIG. 2, for example, the debugger can be implemented on a host computer attached to a cluster or parallel grid of computers. The debugger 401 desirably receives debugging data from the remote debugger components 402 and the monitor components 409. The debugger 401 can be implemented using any suitable system, method or technique known in the art for debugging an application. The debugger 401 can be implemented using software, hardware, or a combination of both.

The remote debugger 402 debugs a particular portion of a parallel application. As described with respect to FIG. 2, for example, a remote debugger 402 is desirably executed at each node of a parallel computing cluster or grid. Each remote debugger 402 desirably attaches to, and debugs, the portion of the parallel application executing on the respective node. Each remote debugger 402 desirably continuously provides the results of the remote debugging session to the debugger 401, where its is desirably aggregated by the aggregator 420. The remote debugger 402 can be implemented using any suitable system, method or technique known in the art for remote debugging. The remote debugger 402 can be implemented using software, hardware, or a combination of both.

The monitor 409 monitors, and collects data regarding the parallel application. The monitor 409 is desirably executed at each node of a parallel computing cluster or grid. Each monitor 409 desirably monitors, and collects data from, the portion of the parallel application executing on the respective node. The monitor 409 desirably collects all of the data passed from the application through the MPI, as well as any data written by the application to a stream of the respective node. The monitor 409 desirably continuously provides the collected data to the debugger 401, where it is desirably aggregated, along with the collected remoter debugger 402 data, by the aggregator 420. The monitor 409 can be implemented using any suitable system, method or technique known in the art for monitoring a remote process, such as a shim for example. The monitor 409 can be implemented using software, hardware, or a combination of both.

The controller 405 desirably starts, and otherwise controls the remote debugger 402 at each node in the parallel cluster. The controller 405 is desirably executed at the host computer with the debugger 401. As described with respect to FIG. 2, for example, the controller 405 desirably collects environment information from each node in the parallel cluster. The controller 405 desirably starts an instance of the remote debugger 402, and the parallel application, at each node in the cluster using the collected environment information. In addition, the controller 405 desirably communicates, to each monitor 409, the PID associated with the parallel application that the monitor 409 should collect data from. The controller 405 can be implemented using any suitable system, method or technique known in the art for controlling and executing a remote process. The controller 405 can be implemented using software, hardware, or a combination of both.

The aggregator 420 receives and aggregates the data received from each of the monitors 409, and remote debuggers 402. As described with respect to FIG. 2, for example, the aggregator 409 is desirably executed at the host computer as a component of the debugger 401. In order to debug the overall parallel application, portions of which are debugged and monitored at different nodes in the cluster, the data from the monitor 409 and the remote debugger 402, for each node, is desirably combined by the aggregator 420 into a cohesive piece of data or report. This report is desirably presented to the user or developer in the debugger client. The aggregator 420 can be implemented using any suitable system, method or technique known in the art for combining debugging data received from a variety of sources. The aggregator 420 can be implemented using software, hardware, or a combination of both.

Exemplary Computing Environment

Figure 5:
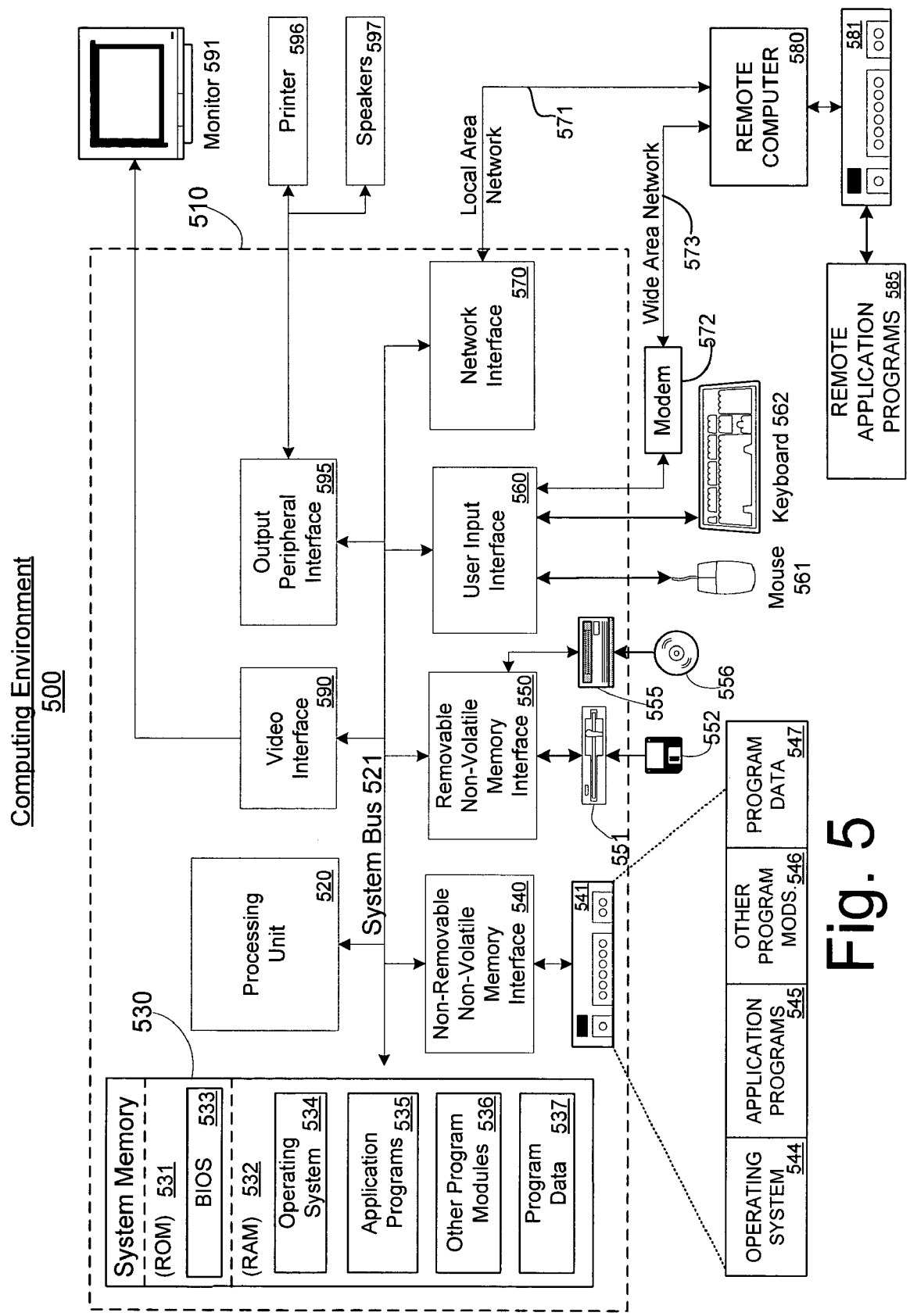
FIG. 5 is a block diagram showing an exemplary computing environment in which aspects of the invention may be implemented.

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of debugging a parallel application, comprising:
   executing a debug client at a host computer, the debug client contacting a daemon executing on each of a plurality of node computers, and the debug client instructing the daemon to staff a shim at each of the plurality of node computers;
   executing the shim on a portion of a parallel application at each of the plurality of node computers to collect data therefrom;
   executing a remote debug client at each of the plurality of node computers to debug the portion of the parallel application at each of the plurality of node computers, the remote debug client forwarding a process identification of the portion of the parallel application to the debug client and the debug client forwarding the process identification to the shim executing on the same node as the portion of the parallel application;
   sending the results of the debugging collected by the remote debug client and data collected by the shim from each of the plurality of node computers to the debug client, the data collected including environment information, the environment information including at least one of a root node name, a path and a run time location; and
   aggregating the received data and results of the debugging by the debug client.

2. The method of claim 1, wherein executing the debug client comprises:
   specifying the name of the parallel application to debug; and
   specifying the name of the shim.

3. The method of claim 2, further comprising opening a port on the host Computer.

4. The method of claim 1, wherein the debug client is a serial debugger.

5. The method of claim 1, wherein the daemon is a message passing interface daemon.

6. The method of claim 1, wherein the remote debug client is a serial debugger.

7. The method of claim 1, wherein executing a portion of a parallel application at each of the plurality of node computers comprises:
   the debug client specifying to the remote debug client, an environment to execute the portion of the parallel application in
   the remote debug client applying the specified environment; and
   the remote debug client attaching to, and executing the portion of the parallel application.

8. The method of claim 1, wherein the collected data comprises message passing interface data.

9. The method of claim 1, wherein the collected data comprises data written to a stream by the portion of the parallel application.

10. The method. of claim 1, wherein the shim sends the collected data to the debug client continuously.

11. The method of claim 1, wherein the shim sends the collected data to the debug client after the portion of the application stops executing.

12. The method of claim 1, wherein the remote debug client sends the results of the debugging to the debug client continuously.

13. The method of claim 1, wherein the remote debug client sends the results of the debugging to the debug client after the portion of the application stops executing.

14. A system for debugging, comprising:
   a parallel application comprising a plurality of processes executing on one or more computing devices, each of the plurality of processes including a process identifier;
   a debugging client for initiating a debugging session on the parallel application, the debugging client executing on at least one of the one or more computing devices, the debugging client contacting a daemon executing on the one or more computing devices, and the debugging client instructing the daemon to start a plurality of shims on the one or more computing devices,
   a plurality of remote debugging clients for debugging each of the plurality of processes, the plurality of remote debugging clients executing on the one or more computing devices and at least one of the plurality of remote debugging clients being initialized by the debugging client, at least one of the plurality of remote debugging clients forwarding the process identifier of at least one of the plurality of processes to the debugging client plurality of remote debugging clients sending results of the debugging to the debugging client; and
   the plurality of shims collecting data about each of the plurality of processes, and sending the collected data to the debugging client, the plurality of shims executing on the one or more computing devices, the debugging client forwarding the process identifier of at least one of the plurality of processes to at least one of the plurality of shims and the collected data including environment information, the environment information including at least one of a root node name, a path and a run time location, the debugging client aggregating the results of the debugging and the collected data.

15. The system of claim 14, wherein the collected data further includes message passing interface data.

16. The system of claim 14, wherein the collected data further includes stream data.

17. The system of claim 14, wherein the debugging client:

executes one or the plurality of processes at each of the one or more computing devices; and attaches one of the plurality of remote debugging clients to each of he plurality of processes.

18. The system of claim 17, wherein the computing device are connected by a wide area network.

19. The system of claim 17, wherein the computing device are connected by a wide area network.

20. The system of claim 17, wherein the computing devices comprise separate processors.

* * * * *